United States Patent
Goodman (10) Patent No.: US 7,483,813 B2
(45) Date of Patent: Jan. 27, 2009

(54) EXPONENTIAL PRIORS FOR MAXIMUM ENTROPY MODELS

(75) Inventor: Joshua T. Goodman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 158 days.

(21) Appl. No.: 11/550,908

(22) Filed: Oct. 19, 2006

(65) Prior Publication Data
US 2007/0043556 A1 Feb. 22, 2007

Related U.S. Application Data

(63) Continuation of application No. 10/766,348, filed on Jan. 28, 2004, now Pat. No. 7,184,929.

(51) Int. Cl.
*G06F 15/00* (2006.01)
*G06F 11/30* (2006.01)

(52) U.S. Cl. .................. 702/181; 702/182; 702/183; 702/184; 709/206

(58) Field of Classification Search .......... 702/181–184, 702/179, 188, 189; 703/2; 704/2, 55; 709/204, 709/206, 224; 713/154
See application file for complete search history.

(56) References Cited

U.S. PATENT DOCUMENTS

| 6,161,130 | A | 12/2000 | Horvitz et al. | |
|---|---|---|---|---|
| 6,304,841 | B1* | 10/2001 | Berger et al. | 704/2 |
| 6,553,358 | B1 | 4/2003 | Horvitz | |
| 6,606,620 | B1 | 8/2003 | Sundaresan et al. | |
| 6,609,094 | B1 | 8/2003 | Basu et al. | |
| 6,697,769 | B1 | 2/2004 | Goodman et al. | |
| 2003/0105638 | A1* | 6/2003 | Taira | 704/275 |
| 2003/0126102 | A1 | 7/2003 | Borthwick | |
| 2004/0260922 | A1* | 12/2004 | Goodman et al. | 713/154 |
| 2004/0260992 | A1 | 12/2004 | Goodman et al. | |
| 2005/0096907 | A1 | 5/2005 | Bacchiani et al. | |
| 2006/0095521 | A1 | 5/2006 | Patinhin | |

OTHER PUBLICATIONS

Chen and Rosenfeld. A Gaussian Prior for Smoothing Maximum Entropy Models. Feb. 1999.
J. Breese, et al., Empirical Analysis of Predictive Algorithms for Collaborative Filtering, in Proceedings of the 14th Conference on Uncertainty in Artificial Intelligence, 1998, pp. 43-52, AUAI, Morgan Kaufmann, San Francisco.
M. Czerwinski, et al., Visualizing Implicit Queries for Information Management and Retrieval, in Proceedings of CHI'99, ACM SIGCHI Conference on Human Factors in Computing Systems, 1999, pp. 560-567, Ass'n for Computing Machinery, Pittsburgh, PA.

(Continued)

*Primary Examiner*—Eliseo Ramos Feliciano
*Assistant Examiner*—Phuong Huynh
(74) *Attorney, Agent, or Firm*—Amin, Turocy & Calvin, LLP (57) ABSTRACT

The subject invention provides for systems and methods that facilitate optimizing one or mores sets of training data by utilizing an Exponential distribution as the prior on one or more parameters in connection with a maximum entropy (maxent) model to mitigate overfitting. Maxent is also known as logistic regression. More specifically, the systems and methods can facilitate optimizing probabilities that are assigned to the training data for later use in machine learning processes, for example. In practice, training data can be assigned their respective weights and then a probability distribution can be assigned to those weights.

18 Claims, 5 Drawing Sheets

OTHER PUBLICATIONS

S. Dumais, et al., Inductive Learning Algorithms and Representations for Text Categorization, in Proceedings of the 7th Internat'l. Conference on Information and Knowledge Mgmt., 1998, pp. 148-155, Ass'n. for Computing Machinery, ACM Press, NY.

E. Horvitz, Principles of Mixed-Initiative User Interfaces, in Proceedings of CHI'99, ACM SIGCH Conference on Human Factors in Computing Systems, 1999, pp. 159-166, Ass'n. for Computing Machinery, Pittsburgh, PA.

E. Horvitz, et al., Display of Information for Time-Critical Decision Making, in Proceedings of the 11th Conference on Uncertainty in Artificial Intelligence, 1995, pp. 296-305, Montreal, Canada, Morgan Kaufmann, San Francisco.

E. Horvitz, et al., The Lumiere Project: Bayesian Use Modeling for Inferring the Goals and Needs of Software Users, in Proceedings of the 14th Conference on Uncertaintly in Artificial Intelligence, 1998, pp. 256-265, Morgan Kaufmann, San Francisco.

E. Horvitz, et al., Time-Dependent Utility and Action Under Uncertainty, in Proceedings of the 7th Conference on Uncertainty in Artificial Intelligence, 1991, pp. 151-158, Morgan Kaufmann, San Francisco.

E. Horvitz, et al., Time-Critical Action: Representations and Application, in Proceedings of the 13th Conference on Uncertainty in Artificial Intelligence (UAI'97), 1997, pp. 250-257, Providence, RI, Morgan Kaufmann, San Francisco.

D. Koller, et al., Toward Optimal Feature Selection, in Proceedings of the 13th Conference on Machine Learning, 1996, pp. 284-292, Morgan Kaufmann, San Francisco.

H. Lieberman, An Agent That Assist Web Browsing, in Proceedings of IJCAI-95, 1995, Montreal, Canada, Morgan Kaufmann, San Francisco.

T. Jaakkola, M. Meila, and T. Jebara. Maximum entropy discrimination. Advances in Neural Information Processing Systems 12. Cambridge, MA: MIT Press, 2000, pp. 470-477.

T. Pedersen, R. Bruce, and J. Wiebe. Sequential model selection for word sense disambiguation. Proceedings of the 1997 Conference on Applied Natural Language Processing. Washington, D.C., 1997, pp. 388-395.

R. Lau. Adaptive statistical language modelling. M.S. thesis, Department of Electrical Engineering and Computer Science, Massachusetts Institute of Technology, Cambridge, MA, 1994. 65 pages.

J. Goodman, Exponential Priors for Maximum Entropy Models, Technical Report, Microsoft Research, Jun. 2003, 14 pages.

J. Goodman, Exponential Priors for Maximum Entropy Models, North American ACL, 2004, 14 pages.

S.F. Chen and J. Goodman. An Empirical Study of Smoothing Techniques for Language Modeling. Computer Speech and Language, 13: 359-394, Oct. 1999.

A. Ratnaparkhi. Maximum Entropy Models for Natural Language Ambiguity Resolution. PhD Thesis, University of Pennsylvania, 1998. 163 pages.

J. Reynar and A. Ratnaparkhi. A Maximum Entropy Approach to Identifying Sentence Boundaries. In ANLP, 1997. 4 pages.

R. Rosenfeld. Adaptive Statistical Language Modeling: A Maximum Entropy Approach. PhD Thesis, Carnegie Mellon University, Apr. 1994. 114 pages.

S. Khudanpur. A Method of Maximum Entropy Estimation with Relaxed Constraints. In 1995 Johns Hopkins University Language Modeling Workshop, 1995. 18 pages.

P.M. Williams. Bayesian Regularization and Pruning using a Laplace Prior. Neural Computation, vol. 7, pp. 117-143, 1995.

M. Banko and E. Brill. Mitigating the Paucity of Data Problem: Exploring the Effect of Training Corpus Size on Classifier Performance for NLP. In Proc. of the Conference on Human Language Technology, 2001. 5 pages.

A.L. Berger, et al. A Maximum Entropy Approach to Natural Language Processing. Computational Linguistics, 22 (1): 39-71, 1996.

S.F. Chen and R. Rosenfeld. A Survey of Smoothing Techniques for ME Models. IEEE Transactions on Speech and Audio Processing, vol. 8 No. 1, Jan. 2000. 14 pages.

S. Della Pietra, et al. Inducing Features of Random Fields. IEEE Transactions on Pattern Analysis and Machine Intelligence, 19(4): 380-393, 1997.

I.J. Good. The Population Frequencies of Species and the Estimation of Population Parameters. Biometrika. vol. 40 No. 3/4, pp. 237-264, 1953.

J. Goodman. Classes for Fast Maximum Entropy Training. In ICASSP 2001. 4 pages.

C.M. Kadie, et al. CFW: A Collaborative Filtering System using Posteriors over Weights of Evidence. In Proc. of UAI, pp. 242-250, 2002.

R. Kneser and H. Ney. Improved Backing-off for M-gram Language Modeling. In ICASSP, vol. 1, pp. 181-184, 1995.

W. Newman. An Extension to the Maximum Entropy Method. IEEE Transactions on Information Theory, vol. IT-23, No. 1, Jan. 1997. 5 pages.

J. Darroch and D. Ratcliff. Generalized Iterative Scaling for Log-linear Models. The Annals of Mathematical Statistics, 43: 1470-1480, 1972.

* cited by examiner

HISTOGRAM OF LAMBDA VALUES

FIG. 7

EXPONENTIAL PRIORS FOR MAXIMUM ENTROPY MODELS

CROSS REFERENCE

This application is a continuation of U.S. patent application Ser. No. 10/766,348, filed on Jan. 28, 2004 now U.S. Pat. No. 7,184,929, entitled "EXPONENTIAL PRIORS FOR MAXIMUM ENTROPY MODELS", and is related to U.S. patent application Ser. No. 11/186,318, filed Jul. 21, 2005, entitled "EXPONENTIAL PRIORS FOR MAXIMUM ENTROPY MODELS", and is related to U.S. patent application Ser. No. 11/186,287, filed Jul. 21, 2005, entitled "EXPONENTIAL PRIORS FOR MAXIMUM ENTROPY MODELS" the disclosures of each of the foregoing is hereby incorporated by reference as if fully set forth herein.

TECHNICAL FIELD

This invention is related to systems and methods involving modeling techniques and in particular, directed to optimizing assignments of probabilities to training data as utilized in various machine learning processes, especially regularizing so-called maximum entropy or logistic regression models.

BACKGROUND OF THE INVENTION

Machine learning is the study of computer algorithms that improve automatically through experience. Applications range from data-mining programs that discover general rules in large data sets, to information filtering systems that automatically learn users' interests. Due to the advent of global communications networks such as the Internet, electronic messaging, and particularly electronic mail ("email"), is becoming increasingly pervasive as a means for disseminating unwanted advertisements and promotions (also denoted as "spam") to network users. As such, junk e-mail or spam is now or soon will become a major threat to trustworthy computing.

One proven filtering technique to combat spam is based upon a machine learning approach—machine learning filters assign to an incoming message a probability that the message is junk. In this approach, features typically are extracted from two classes of example messages (e.g. spam and non-spam (good) messages), and a learning filter is applied to discriminate probabilistically between the two classes.

In general, there are several types of learning algorithms that can be employed with respect to machine learning. In particular, conditional maximum entropy (maxent) models have been widely used for a variety of tasks, including language modeling, part-of-speech tagging, prepositional phrase attachment, and parsing, word selection for machine translation, and finding sentence boundaries. They are also sometimes called logistic regression models, maximum likelihood exponential models, log-linear models, and can be equivalent to a form of perceptrons, or single layer neural networks. In particular, perceptrons that use the standard sigmoid function, and optimize for log-loss are equivalent to maxent.

Conditional maxent models have traditionally either been unregularized or regularized by using a Gaussian prior on the parameters. However, when employing a Gaussian prior, higher error rates can result. For example, training data based at least in part upon Gaussian priors may yield increased incidences of inaccurate filtering with respect to catching spam. Regularization is needed to prevent overfitting—overfitting is a phenomenon related to a learning algorithm adapting so well to a training set that random disturbances in the training set are included in the model as being meaningful. As these disturbances do not reflect underlying distribution thereof, performance on a test set or training set of data (with its own, but definitively other disturbances) can suffer from techniques that learn too well.

Conditional maxent models are of the form $$P_\Lambda(y|\bar{x}) = \frac{\exp\sum_{i=1}^{F} \lambda_i f_i(\bar{x}, y)}{\sum_{y'} \exp\sum_{i} \lambda_i f_i(\bar{x}, y')}$$

where $\bar{x}$ is an input vector, y is an output, the $f_i$ are so-called indicator functions or feature values that are true if a particular property of $\bar{x}$,y is true, $\Lambda$ represents a parameter set $\lambda_1 \ldots \lambda_n$, and $\lambda_i$ is a weight for the indicator $f_i$. Consider an example such as word sense disambiguation. In this example, the goal is to determine if a particular word, e.g. "bank", has a particular sense, e.g. financial bank or river bank. In this example, $\bar{x}$ would be the context around an occurrence of the word bank; y would be a particular sense, e.g., financial or river; $f_i(\bar{x},y)$ could be 1 if the context includes the word "money" and y is the financial sense; and $\lambda_i$ would be a large positive number. Other $f_i$ would represent other properties, e.g. the nearby presence of other words.

Maxent models have several valuable properties. The most important is constraint satisfaction. For a given $f_i$, we can count how many times $f_i$ was observed in the training data with value y, $$\text{observed}[i] = \sum_j f_i(\bar{x}_j, y_j).$$

For a model $P_{\bar{\lambda}}$ with parameters $\bar{\lambda}$, we can see how many times the model predicts that $f_i$ would be expected to occur:

$$\text{expected}[i] = \sum_{j,y} P_{\bar{\lambda}}(y | \bar{x}_j) f_i(\bar{x}_j, y).$$

Maxent models have a property that expected[i]=observed[i] for all i and y. These equalities are called constraints. The next important property is that the likelihood of the training data is maximized (thus, the name maximum likelihood exponential model). Third, the model is as similar as possible to a uniform distribution (e.g., minimizes the Kullback-Leibler divergence), given the constraints, which is why these models are called maximum entropy models.

The third property is a form of regularization. However, it turns out to be an extremely weak one—it is not uncommon for models, especially those that use all or most possible features, to assign near-zero probabilities (or, if $\lambda$s may be infinite, even actual zero probabilities), and to exhibit other symptoms of severe overfitting. There have been a number of approaches to this problem. The most relevant conventional approach employs a Gaussian prior for maxent models. A Gaussian prior is placed with 0 mean and $\sigma_i^2$, variance on the model parameters (the $\lambda_i$ s), and then a model that maximizes the posterior probability of the data and the model is found.

Maxent models without priors use the parameters Λ that maximize $$\underset{\Lambda}{\mathrm{argmax}} \prod_{j=1}^{n} P_\Lambda(y_j | \overline{x_j})$$

where $\overline{x}_j$, $y_j$ are training data instances. With a Gaussian prior we find $$\underset{\Lambda}{\mathrm{argmax}} \prod_{j=1}^{n} P_\Lambda(y_j | \overline{x_j}) \times \prod_{i=1}^{F} \frac{1}{\sqrt{2\pi\sigma_i^2}} \exp\left(-\frac{\lambda_i^2}{2\sigma_i^2}\right)$$

In this case, a trained model does not satisfy the constraints expected[i]=observed[i], but, as was shown, instead satisfies constraints $$\text{expected } [i] = \text{observed } [i] - \frac{\lambda_i}{\sigma_i^2} \quad (1)$$

That is, instead of a model that matches the observed count, a model that matches the observed count minus the value $$\frac{\lambda_i}{\sigma_i^2}$$

is obtained. In language modeling terms, this is referred to as "discounting."

However, all models cannot be generated by the same process, and thus a single prior may not work best for all problem types.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for systems and methods that facilitate optimizing one or mores sets of training data by utilizing an Exponential distribution as a prior on one or more parameters in connection with a maximum entropy (maxent) model to mitigate overfitting. More specifically, the systems and methods can facilitate optimizing probabilities that are assigned to the training data for later use in machine learning processes, for example. In practice, training data can be assigned their respective weights and then a probability distribution can be assigned to those weights.

With respect to some experimental results, when observing one particular set of parameters, one may notice that it is not Gaussian, but much more similar to a 0 mean Laplacian, $$P(\lambda_i) = \frac{1}{2\beta_i} \exp\left(-\frac{|\lambda_i|}{\beta_i}\right),$$

or to an Exponential distribution $P(\lambda_i) = \alpha_i \exp(-\alpha_i \lambda_i)$, which is non-zero only for non-negative $\lambda_i$. In some cases, learned parameter distributions will match the prior distribution. Moreover, optimization of the subject models can be much simpler with an Exponential prior.

With an Exponential prior, one can maximize $$\underset{\Lambda \geq 0}{\mathrm{argmax}} \prod_{j=1}^{n} P_\Lambda(y_j | \overline{x_j}) \times \prod_{i=1}^{F} \alpha_i \exp(-\alpha_i \lambda_i) \quad (2)$$

As will also be described infra, performing this maximization is significantly simpler to perform than the Gaussian maximization. Furthermore, models satisfying Equation 2, will have the property that, for each $\lambda_i$, etiher a) $\lambda_i = 0$ and expected[i]≧observed[i]−$\alpha_i$ or b) expected[i]=observed[i]−$\alpha_i$. In other words, the observed counts can be essentially discounted by the constant $\alpha_i$ (which is an inverse of the standard deviation), subject to the constraint that $\lambda_i$ is non-negative. This is much simpler and more intuitive than the constraints associated with the Gaussian prior (Equation 1), since those constraints change as the values of $\lambda_i$ change.

It should be appreciated that the present invention can be applied to different types of applications such as collaborative filtering, grammar checking, spam filtering, text categorization, and email usage.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with automatically determining a threshold amount such as per customer/user. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In general, classifiers such as spam filters can be trained to distinguish between and determine which messages are more likely to be spam and which messages are less likely to be spam (e.g., legitimate messages). This can be accomplished in part through the use of weights or probabilities. Weights are assigned to various training data such as particular words, word pairs, or word phrases based on their affinity to indicate spam or legitimate messages. When running the weights through a sigmoid function, the particular weights can be converted into probabilities. The resulting probabilities can predict the likelihood that a message is spam or not spam, for example.

Figure 1:
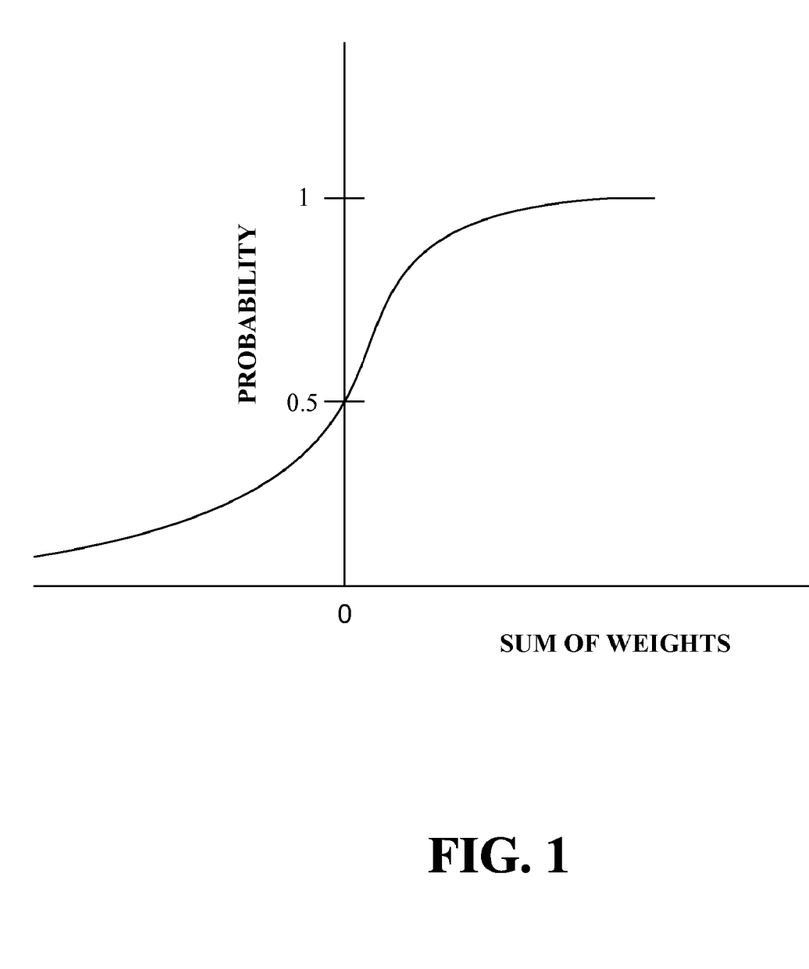
FIG. 1 is a graphical representation of a Gaussian distribution.

FIG. 1 illustrates the sigmoid function in graphical form. As can be seen in the figure, the x-axis refers to the sum of weights and the y-axis refers to the corresponding probability. Thus, if the sum of the weights equal to 0, then the probability is equal to 0.5. As the sum of the weights approach positive infinity, the probability is equal to 1. Likewise, as the sum of the weights approach negative infinity, the probability is equal to 0. Overall, obtaining highest possible probabilities is desired without overfitting.

Applying an exemplary sigmoid function 100 as graphically displayed in FIG. 1, imagine there was a word such as "mother" that appeared in 3 separate training data messages all three of which were known to be good messages. In order to maximize the probability of the training data, we would need to set the probability of "good" of each of these three messages to 1. Observing the sigmoid of FIG. 1, we see that the probability approaches 1 as the sum of the weights (lambdas) approaches infinity. Thus, we would assign a weight approximating or approaching infinity to the presence of the word "mother." This would be problematic. Any spam message containing the word "mother" would then receive an infinite weight, and probability 1 of being good, no matter how much other evidence there was that the message was spam. Thus, without regularization, overfitting occurs typically leading to a high error rate of an associated classifier or filter.

One technique to mitigate overfitting involves assigning a probability distribution to the weights. For instance, the probability of a weight being extremely large is very small; the probability of a weight approaching infinity is near zero; a weight that is equal to 0 is highly likely; and a weight that is equal to a negative is highly unlikely. Following then, a joint maximization on the probability as well as on the weight of the training data can be performed.

In the past, probabilities were assigned to weights of training data using Gaussian priors (e.g., Gaussian maximization). However, this technique can also result in overfitting as evinced by an undesirable amount of errors. The present invention provides and performs a learning methodology with an Exponential prior combined with an iterative scaling methodology. By employing systems and methods in accordance with the subject invention, higher probabilities for training data, for example, can be obtained while mitigating overfitting. In practice, for instance, imagine that the training data can be employed to teach spam filters to distinguish between spam messages and legitimate messages. The probabilities assigned to such training data can be more accurate and thus more effective in training the filters.

Figure 2:
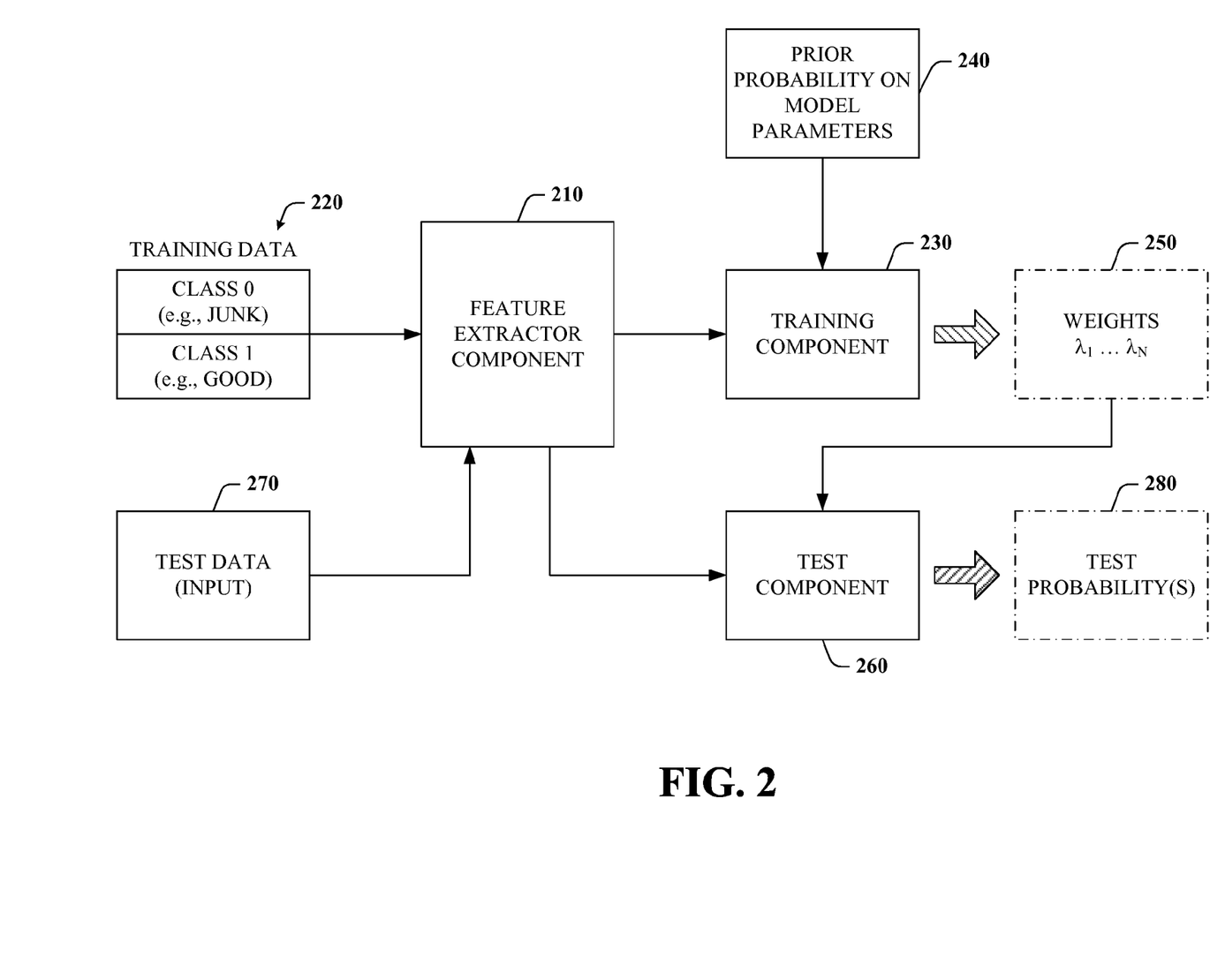
FIG. 2 is a high-level block diagram of a probability generation and maximization system in accordance with an aspect of the present invention.

Referring now to FIG. 2, there is illustrated a high level block diagram of a probability generation system 200 in accordance with an aspect of the present invention. For ease of understanding, the system 200 will be described in the context of determining probabilities for various features of messages to ascertain whether an incoming message is spam (junk) or legitimate (good).

The system 200 comprises a feature extractor component 210 that can extract one or more features from at least a subset of training data 220. The training data 220 can include one or more types of training data depending on the desired training. In this case, two classes of data are employed: class 0 representing "junk" messages and/or features; and class 1 representing "good" messages and/or features. Features are obtained from the training data and then communicated to a training component 230. Examples of features include, but are not limited to, IP address, email address, subject line content, message size, embedded images in the message, message text, and the like.

The training component 230 analyzes the extracted features using at least in part the prior probability(s) on model parameters (240). As a result of such analyses, one or more weights 250 can be computed and/or determined. The one or more weights 250 can then be employed with respect to a test component 260 and applied to at least a portion of test data 270. In particular, test data 270 is provided to the feature extractor component 210, whereby one or more features are extracted and communicated to the test component 260. The test component 260 can then generate test probability(s) 280 that correspond respectively to the extracted (test) features.

Learning methodologies can be based on a concept referred to as gradient descent. Briefly, gradient decent techniques involve the desire to take a downhill step in a space. Thus, the downhill direction must be determined, and once it is found, a step in that direction can be taken. Unfortunately, it can be difficult to determine the correct size step to take in a downhill direction. However, a variation on a standard methodology referred to as Generalized Iterative Scaling (GIS) can solve this problem. In particular, GIS uses an update rule of the form $$\lambda_i := \lambda_i + \frac{1}{f^\#} \log \frac{\text{observed}\,[i]}{\text{expected}\,[i]}$$

Meanwhile, the subject modified methodology according to the present invention can employ a rule of the form $$\lambda_i := \max 0, \left(\lambda_i + \frac{1}{f^\#} \log \frac{\text{observed}\,[i] - \alpha_i}{\text{expected}\,[i]}\right) \quad (3)$$

Note that there are two different styles of model that one can use, especially in the common case that there are two outputs (values for y). Consider a word sense disambiguation problem such as trying to determine whether a word like "bank" means the river or financial sense, with questions like whether or not the word "water" occurs nearby. One could have a single indicator function $f_1(x,y)=1$ if water occurs nearby and values in the range $-\infty < \lambda_1 < \infty$. We call this style "double sided" indicators.

Alternatively, one could have two indicator functions, $f_1(x, y)=1$ if water occurs nearby and y=river and $f_2(x,y)=1$ if water occurs nearby and y=financial. In this case, one could allow either $-\infty < \lambda_1, \lambda_2 < \infty$ or $0 \leq \lambda_1, \lambda_2 < \infty$. This style with two indicators can be referred to as "single sided." With a Gaussian prior, it does not matter which style one uses—one can show that by changing $\sigma^2$, exactly the same results will be achieved. With a Laplacian (double sided exponential), one could also use either style. With an Exponential prior, only positive values are allowed, so one must use the double sided style, so that one can learn that some indicators push towards one sense, and some push towards the other—that is, rather than having one weight which is positive or negative, we have two weights which are positive or zero, one of which pushes towards one answer, and the other pushing towards the other.

According to an aspect of the present invention, the constraints and learning algorithm can be derived in part by maximizing the log of Equation 2 rather than the equation itself. This leads to an objective function:

$$L(\Lambda) = \sum_j \log P_\Lambda(y_j|\overline{x_j}) - \sum_{i=1}^{F} \alpha_i \lambda_i + const(\Lambda) \quad (4)$$

$$= \sum_j \sum_{i=1}^{F} \lambda_i f_i(\overline{x_j}, y_j) -$$

$$\sum_j \log \sum_y \exp\left(\sum_{i=1}^{F} \lambda_i f_i(\overline{x_j}, y)\right) -$$

$$\sum_{i=1}^{F} a_i \lambda_i + const(\Lambda)$$

Note that this objective function is convex (since it is the sum of two convex functions). Thus, there is a global maximum value for this objective function.

Now, we wish to find the maximum. Normally, we would do this by setting the derivative to 0, but the bound of $\lambda_k \geq 0$ changes things a bit. The maximum can then occur at the discontinuity in the derivative ($\lambda_k = 0$) or when $\lambda_k > 0$. We can explicitly check the value of the objective function at the point $\lambda_k = 0$. When there is a maximum with $\lambda_k > 0$ we know that the partial derivative with respect to $\lambda_k$ will be 0.

$$\frac{\partial}{\partial \lambda_k} \sum_j \sum_{i=1}^{F} \lambda_i f_i(\overline{x_j}, y_j) - \sum_j \log \sum_y \exp\left(\sum_{i=1}^{F} \lambda_i f_i(\overline{x_j}, y)\right) - \sum_{i=1}^{F} \alpha_i \lambda_i +$$

$$const(\Lambda) = \sum_j f_k(\overline{x_j}, y_j) - \sum_j \frac{\sum_y f_k(\overline{x_j}, y) \exp\left(\sum_{i=1}^{F} \lambda_i f_i(\overline{x_j}, y)\right)}{\sum_y \exp\left(\sum_{i=1}^{F} \lambda_i f_i(\overline{x_j}, y)\right)} - \alpha_k =$$

$$\sum_j f_k(\overline{x_j}, y_j) - \sum_j \sum_y f_k(\overline{x_j}, y) P_\Lambda(y|\overline{x_j}) - \alpha_k$$

This implies that at the optimum, when $\lambda_k > 0$, $$\sum_j f_k(\overline{x_j}, y_j) - \sum_j \sum_y f_k(\overline{x_j}, y) P_\Lambda(y|\overline{x_j}) - \alpha_k = 0 \quad (5)$$

observed $[k]$ − expected $[k]$ − $\alpha_k = 0$ observed $[k]$ − $\alpha_k$ = expected $[k]$ In other words, we discount the observed count by $\alpha_k$—the absolute discounting equation. However, sometimes it is better for $\lambda_k$ to be set to 0-another possible optimal point is when $\lambda_k = 0$ and observed$[k]-\alpha_k <$ expected$[k]$. One of these two cases should hold at the optimum.

Notice an important property of Exponential priors: they often favor parameters that are exactly 0. This leads to a kind of natural pruning for Exponential priors, not found in Gaussian priors, which are only very rarely 0. It should be appreciated that exclusively pruning through increasing the Exponential prior is not always favored—if pruning is important to save memory or increase speed, then other pruning techniques should be used, because there is an important difference between removing parameters to save memory, which involves minimizing the loss in accuracy/entropy of the model, versus increasing the prior, which would cause oversmoothing if used in that way. For instance, traditional feature selection techniques can be used, or features with low weights can be pruned. However, one should not increase the Exponential prior to control pruning, as this will lead to oversmoothing. If additional pruning is needed for speed or memory savings, feature selection techniques should be used, such as pruning small or infrequent parameters, instead of a strengthened prior.

The update methodology can now be derived. The derivation employs an Exponential prior instead of a Gaussian prior. In each iteration, we try to find $\Delta = \{\delta_i\}$ that maximizes the increase in the objective function (subject to the constraint that $\delta_i + \lambda_i \geq 0$).

$$L(\Lambda + \Delta) - L(\Lambda) =$$

$$\sum_j \sum_i \delta_i f_i(\overline{x_j}, y_j) - \sum_j \log \sum_y P_\Lambda(y|\overline{x_j}) \exp\left(\sum_i \delta_i f_i(\overline{x_j}, y)\right) - \sum_i \alpha_i \delta_i$$

As with the Gaussian prior, it is not clear how to maximize this function directly, so instead we use an auxiliary function, B(Δ), with three important properties: first, we can maximize it; second, it bounds this function from below; third, it is larger than zero whenever Λ is not at a local optimum, i.e. does not satisfy the constraints in Equation 5. Using the well-known inequality $\log x \leq x-1$, which implies $-\log x \geq 1-x$, we obtain $$L_X(\Lambda+\Delta) - L_X(\Lambda) \geq$$

$$\sum_j \sum_i \delta_i f_i(\overline{x_j}, y_j) + \sum_j 1 - \sum_y P_\Lambda(y|\overline{x_j}) \exp\left(\sum_i \delta_i f_i(\overline{x_j}, y)\right) - \sum_i \alpha_i \delta_i \quad (6)$$

Let $$f^\#(x, y) = \sum_i f_i(x, y).$$

Modify Equation 6 to:

$$L_X(\Lambda+\Delta) - L_X(\Lambda) \geq \sum_j \sum_i \delta_i f_i(\overline{x_j}, y_j) + \sum_j 1 - \quad (7)$$

$$\sum_y P_\Lambda(y|\overline{x_j}) \exp\left(f^\#(\overline{x_j}, y) \sum_i \delta_i \frac{f_i(\overline{x_j}, y)}{f^\#(\overline{x_j}, y)}\right) - \sum_i \alpha_i \delta_i$$

Now, recall Jensen's inequality, which states that for a convex function g, $$\sum_y p(x)g(x) \geq g\left(\sum_x p(x)x\right)$$

Notice that $$\frac{f_i(x, y)}{f^\#(x, y)}$$

is a probability distribution. Thus, we obtain $$L_X(\Lambda+\Delta) - L_X(\Lambda) \geq \sum_j \sum_i \delta_i f_i(\overline{x_j}, y_j) + \sum_j 1 - \quad (8)$$

$$\sum_y P_\Lambda(y|\overline{x_j}) \sum_i \frac{f_i(\overline{x_j}, y)}{f^\#(\overline{x_j}, y)} \exp(f^\#(\overline{x_j}, y)\delta_i) - \sum_i \alpha_i \delta_i$$

Now, we would like to find Δ that maximizes Equation 8. Thus, we take partial derivatives and set them to zero, remembering to also check whether a maximum occurs when $\delta_k=0$.

$$\frac{\partial}{\partial \delta_k} \sum_j \sum_i \delta_i f_i(\overline{x_j}, y_j) + \sum_j 1 -$$

$$\sum_y P_\Lambda(y|\overline{x_j}) \sum_i \frac{f_i(\overline{x_j}, y)}{f^\#(\overline{x_j}, y)} \exp(f^\#(\overline{x_j}, y)\delta_i) - \sum_i \alpha_i \delta_i =$$

-continued $$\sum_j f_k(\overline{x_j}, y_j) + \sum_j - \sum_y P_\Lambda(y|\overline{x_j}) \frac{f_k(\overline{x_j}, y)}{f^\#(\overline{x_j}, y)} \frac{\partial}{\partial \delta_k} \exp(f^\#(\overline{x_j}, y)\delta_k) - \alpha_k =$$

$$\sum_j f_k(\overline{x_j}, y_j) - \sum_j \sum_y P_\Lambda(y|\overline{x_j}) f_k(\overline{x_j}, y) \exp(f^\#(\overline{x_j}, y)\delta_k) - \alpha_k = 0$$

This provides a version of Improved Iterative Scaling with an Exponential Prior. In general, however, we prefer variations of Generalized Iterative Scaling, which may not converge as quickly, but lead to simpler algorithms. In particular, we set $f^\# = \max_{x,y} f^\#(x,y)$.

Then, instead of Equation 7, the following is obtained:

$$L_X(\Lambda+\Delta) - L_X(\Lambda) \geq \sum_j \sum_i \delta_i f_i(\overline{x_j}, y_j) + \sum_j 1 - \quad (9)$$

$$\sum_y P_\Lambda(y|\overline{x_j}) \exp\left(f^\#(\overline{x_j}, y) \sum_i \delta_i \frac{f_i(\overline{x_j}, y)}{f^\#(\overline{x_j}, y)}\right) - \sum_i \alpha_i \delta_i$$

Essentially the same derivation can follow from there. It should be appreciated that a slack parameter can be added. The slack parameter can then be given a near-zero variance prior so that its value stays at 0, and hence, in practice, it can be ignored. Thus, the following is obtained:

$$\frac{\partial}{\partial \delta_k} \sum_j \sum_i \delta_i f_i(\overline{x_j}, y_j) + \sum_j 1 - \quad (10)$$

$$\sum_y P_\Lambda(y|\overline{x_j}) \sum_i \frac{f_i(\overline{x_j}, y)}{f^\#} \exp(f^\# \delta_i) - \sum_i \alpha_i \delta_i =$$

$$\sum_j f_k(\overline{x_j}, y_j) - \sum_j \sum_y P_\Lambda(y|\overline{x_j}) f_k(\overline{x_j}, y) \exp(f^\# \delta_k) - \alpha_k =$$

$$\text{observed }[k] - \text{expected }[k] \exp(f^\# \delta_k) - \alpha_k = 0$$

From Equation 10, the following can be obtained:

$$\delta_k = \frac{1}{f^\#} \log \frac{\text{observed }[k] - \alpha_k}{\text{expected }[k]}$$

Now $\delta_k + \lambda_k$ may be less than 0; in this case, an illegal new value for $\lambda_k$ would result. However, from the monotonicity of all the equations with respect to $\delta_k$, it can be concluded that the lowest legal value of $\delta_k$ will be the best, and thus, the following can be arrived at:

$$\delta_k = \max\left(-\lambda_k, \frac{1}{f^\#} \log \frac{\text{observed }[k] - alpha_k}{\text{expected }[k]}\right)$$

or equivalently $$\lambda_k := \max\left(0, \lambda_k + \frac{1}{f^\#} \log \frac{\text{observed }[k] - alpha_k}{\text{expected }[k]}\right)$$

Let $$f^\#(x, y) = \sum_i f_i(x, y).$$

Then, in the end, an update equation of the following form can be obtained:

$$\lambda_k := \max\left(0, \lambda_k + \frac{1}{f^\#}\log\frac{\text{observed }[k] - a_k}{\text{expected }[k]}\right)$$

Compare this equation to the corresponding equation with a Gaussian prior. With a Gaussian prior, one can derive an equation of the form:

$$\text{observed }[k] - \frac{\lambda_k}{\sigma_k^2} = \text{expected }[k]\exp(f^\#\delta_k)$$

and then solve for $\delta_k$. However, there is no closed form solution to this equation—it should be solved using numerical methods, such as Newton's method, making this update equation much more complex and time consuming than the Exponential prior.

Good-Turing discounting has been used or suggested for language modeling, for example, several times. The need for discounting can be illustrated in the following manner. Imagine that a person has been fishing for a while and would like to know the probability of seeing a fish that hasn't been seen yet today. Some may ask how it can be possible to know the probability of something that has never happened. It turns out that this is equivalent to determining the probability of the next fish I see having a count of one. That is, the first time the person sees the different fish, it will have been seen one time. Hence, take a count of all the kinds of fish the person has seen one time. For instance, assume tuna has a count of one, shark has a count of one, and trout has a count of three. Next, add the total of fish seen once (e.g., 2) and then divide that total number of such fish (e.g., 2) by the total number of fish seen (e.g., 5).

Without discounting, the breakdown of probabilities appears as follows:

⅕ to see a tuna;
⅕ to see a shark;
⅗ to see a trout; and
⅖ to see a different fish (e.g., a fish having a count of one).

The total adds up to ⅞ which is not possible. Thus, an amount has to be subtracted from something else to make room for the new thing (i.e., probability of seeing the new thing). This can be accomplished in part by employing a discounting technique such as the Good-Turing discount.

The Good-Turing discount can be depicted by the following:

$$r^* = (r+1)\frac{n_{r+1}}{n_r}$$

Thus, discounting can be described conceptually as providing a smoothing of high peaks (e.g., data or data points) and low valleys across a distribution. It should be appreciated that the amount of discounting depends on an observed count. Thus, a first discount can be employed for an observed count of 10 whereas a second discount can be employed for an observed count of 20.

In particular, it has been suggested to use an update of the form $$\lambda_k := \lambda_k + \frac{1}{f^\#}\log\frac{\text{observed }[k]^*}{\text{expected }[k]}$$

where observed[k]* is the Good-Turing discounted value of observed[k]. This update has a problem, as noted by its proponents: the constraints are probably now inconsistent—there is no model that can simultaneously satisfy them—and the convergence proofs of GIS do not apply.

However, a simple variation on this update, inspired by the Exponential prior, does not exhibit these problems:

$$\lambda_k := \max 0, \left(\lambda_k + \frac{1}{f^\#}\log\frac{\text{observed }[k]^*}{\text{expected }[k]}\right)$$

In particular, this can be thought of as picking an $\alpha_{observed\,[k]}$ for each k. This does not constitute a Bayesian prior, since the value is picked after the counts are observed, but it does lead to a convex objective function very similar to Equation 4, with a global maximum, and the update function will converge towards this maximum. Variations on the constraints of Equation 5 will apply for this modified objective function. Furthermore, in the experimental results section, we will see that on a language modeling task, this modified update function outperforms the traditional update. By using a well motivated approach inspired by Exponential priors, we can find a simple variation that has better performance both theoretically and empirically.

Alternatively or in addition, an Exponential prior can also be combined with Sequential Conditional Generalized Iterative Scaling which can lead to an update rule of the form:

$$\lambda_k := \max\left(0, \lambda_k + \frac{1}{f_k^\#}\log\frac{\text{observed }[k] - a_k}{\text{expected }[k]}\right)$$

where $$f_k^\# = \max_i f_k(\bar{x}_i, y_i)$$

However, it can also be combined with Improved Iterative Scaling in which case the update rule is more complex. In this case, one numerically solves for $\delta_i$ in the equation below, and uses that for the update as long as $\delta_i + \lambda_i < 0$ is set to 0. Hence, the update rule is in the form:

$$\text{observed }[k] = \sum_j \sum_y P_\Lambda(y|\bar{x}_j) f_k(\bar{x}_j, y)\exp(f^\#(\bar{x}_j, y)\delta_k) + \alpha_k$$

According to some experiments, the results demonstrate that Exponential priors outperform Gaussian priors on at least two different data sets. For these experiments, a single variance for both the Gaussian and the Exponential prior was employed, rather than one per parameter, with the variance optimized on held out data. In particular, the grammar-checking data of Banko and Brill (e.g., M. Banko and E. Brill. Mitigating the paucity of data problems. In HLT, 2001) was utilized in a first experiment. This set was chosen because there are commonly used versions both with small amounts of data (which is when we expect the prior to matter) and with large amounts of data (which is required to easily see what the distribution over "correct" parameter values is). For this first experiment, a model was trained using a Gaussian prior, using a large amount of data. Those parameters ($\lambda$'s) that had at least 35 training instances were then determined and/or isolated—enough to typically overcome the prior and train the parameter reliably. The distribution of these parameters was then graphed.

Figure 3:
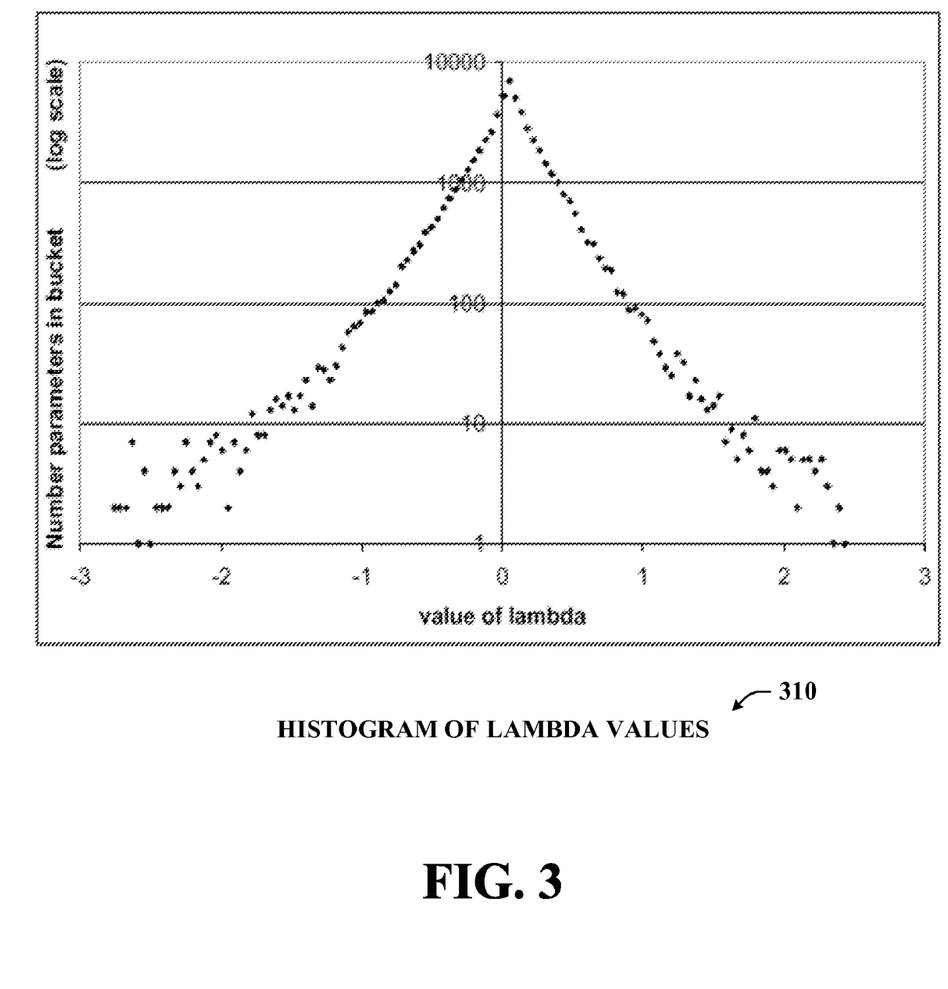
FIG. 3 is an exemplary histogram of a distribution of parameters being examined to facilitate determining a best-fitting Exponential prior in accordance with an aspect of the present invention.

While it is common to look at the distribution of data, this invention examines distributions of model parameters, which can be effective in facilitating the determination of priors (e.g., using those parameters with enough data to help guess the priors for those with less, or at least to determine the correct form for the prior, if not the exact values). The results are shown in FIG. 3, which is a histogram 300 of $\lambda$'s 310 with a given value. If the distribution were Gaussian, one would expect this to look like an upside-down parabola. If the distribution were Laplacian, one would expect it to appear as a triangle (the bottom formed from the X-axis). Indeed, it does appear to be roughly triangular; and to the extent that it diverges from this shape, it is convex, while a Gaussian would be concave.

Moreover, the Exponential prior may not be suitable for every problem—the invention merely asserts that based on both better accuracy (e.g. the next experiment) and a better fit to at least some of the parameters, that the Exponential prior is better for some models.

The second experiment involved using Exponential priors in accordance with at least one aspect of the present invention. The results demonstrate improvements in error rate. A small data set comprising 100,000 sentences of training data and ten different confusable word pairs were used. (Most training sentences did not contain examples of the confusable word pairs of interest). We tried different priors for the Gaussian and Exponential prior, and found the best single prior on average across all ten pairs. With this best setting, we achieved a 14.51% geometric average error rate with the Exponential prior, and 15.45% with the Gaussian. To avoid any form of cheating, we then tried 10 different word pairs (the same as those used by Banko and Brill) with this best parameter setting. The results were 18.07% and 19.47% for the Exponential and Gaussian priors, respectively. (The overall higher rate is due to the test set words being slightly more difficult). We also tried experiments with 1 million and 10 million words, but there were not consistent differences because improved smoothing mostly matters with small amounts of training data.

In a third experiment, a collaborative-filtering style task, television show recommendation, based on Nielsen data was tested. The dataset used, and the definition of a collaborative filtering (CF) score is the same as was used by Kadie et aL (e.g., Carl M. Kadie, Christopher Meek, and David Heckerman. CFW: A collaborative filtering system using posteriors over weights of evidence. In *Proceedings of UAI*, pp. 242-250, 2002), although our random train/test split is not the same, so the results are not strictly comparable. Experiments were first run with different priors on a heldout section of the training data, and then using the single best value for the prior (the same one across all features). We ran on the test data. With a Gaussian prior, the CF score was 42.11, while with an Exponential prior, it was 45.86—yet another large improvement using the Exponential prior over the Gaussian prior.

Various methodologies in accordance with the subject invention will now be described via a series of acts. It is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 4:
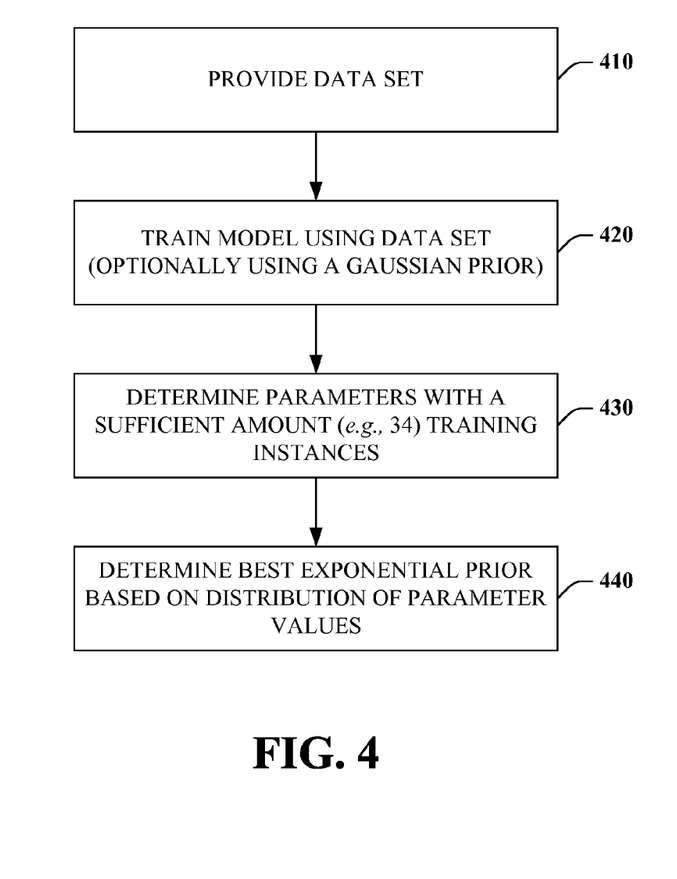
FIG. 4 is a flow diagram of an exemplary process that facilitates determining a desirable Exponential prior in accordance with an aspect of the present invention.

Referring now to FIG. 4, there is illustrated a flow diagram of an exemplary process 400 that facilitates determining a best Exponential prior. Recalled that maxent models and in particular, conditional maxent models, can be regularized or unregularized by employing an Exponential prior on a plurality of parameters. The exemplary process 400 for determining the Exponential prior involves providing a data set at 410. The data set can comprise any number of data depending on user preferences and the desired application. For instance, with a smaller amount of data, one can expect the prior to matter. That is, the data set or training data is generally more significant when less data is available to predict model behavior. Conversely, with a larger amount of data, one can more easily determine or observe what the distribution over correct parameters values is.

At 420, a maxent model can be trained using a Gaussian prior, for example, as well as a larger amount of data. Following, parameters which have a sufficient number of training instances can be isolated or located. According to this exemplary process 400, those parameters having at least 35 training instances can be found. A quantity of 35 may be enough to overcome the prior and train the parameter reliably. In other words, these parameters have enough experience and are therefore determined to be reliable to receive or act upon a data set.

The distribution of the reliable parameters can be graphed such as demonstrated in FIG. 3, supra. By examining the distribution of such parameters, an optimal Exponential prior having a better fit to at least some of the parameters can be ascertained. It should be appreciated that different Exponential priors can be used with respect to different models or features. For example, with respect to spam filters and classifying messages as spam or not, some features of a message can be more useful than others, such as the IP address. Hence, one can expect that IP address feature to have a larger value. In practice then, a particular Exponential prior may have a larger $\sigma^2$ for the IP address feature than for other message features. Note that this is only one way to find the variance for the prior. Alternative techniques include using cross-validation or held out data, and finding the variance that minimizes the entropy on this cross-validation or held out data.

Figure 5:
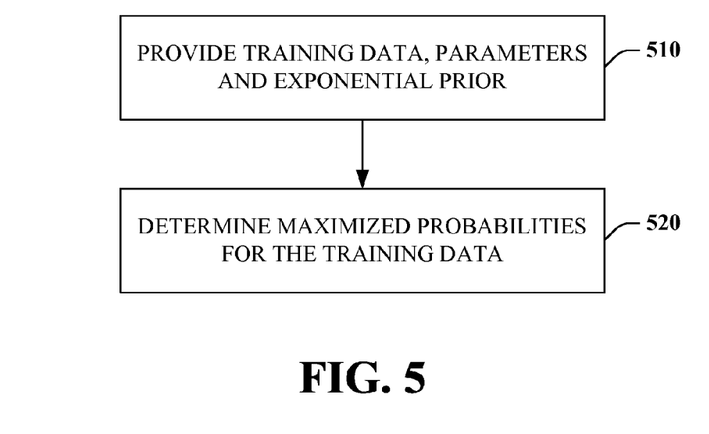
FIG. 5 is a flow diagram of an exemplary process that facilitates obtaining maximized probability values in accordance with an aspect of the present invention.

Referring now to FIG. 5, there is illustrated a flow diagram of an exemplary process 500 that facilitates maximizing probability values obtained for assignment to training data, for example. The process 500 involves providing training data, a parameter set comprising a plurality of parameters and a suitable Exponential prior as determined by the process 400, for instance, at 510. At 520, a model can be trained using the Exponential prior, the data set and the given parameters to determine the optimal probabilities for the training data. In particular, such determination can be performed in part by employing various forms of mathematical and/or graphical analyses.

In practice, imagine the training data or data set comprises 1000 different word pairs or phrases. The weight (λ value) associated with each particular word pair or phrase indicates a spam message can be determined and maximized to its best value. Furthermore, the trained model can be updated by way of a function that desirably converges to a global maximum. Meanwhile, overfitting is mitigated so that fewer errors are made when identifying messages as spam or not spam based in part on such probabilities.

Figure 6:
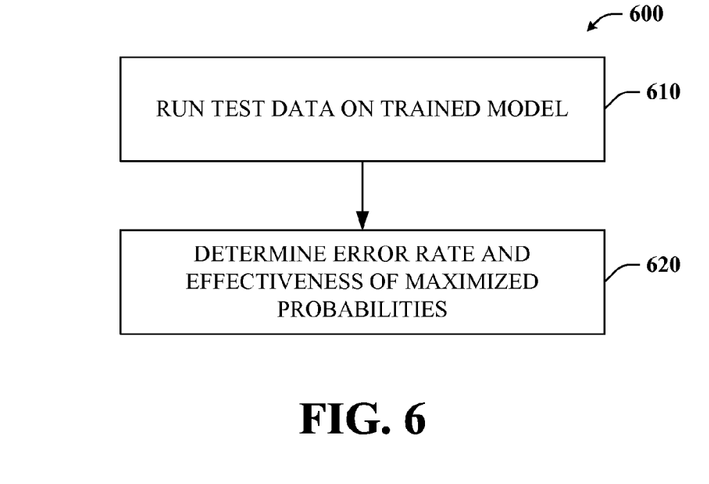
FIG. 6 is a flow diagram of an exemplary process that facilitates determining an effectiveness of a trained model in accordance with an aspect of the present invention.

Referring now to FIG. 6, there is illustrated a flow diagram of an exemplary process 600 that makes use of a trained model in accordance with the present invention. In particular, the process 600 involves running test data on the trained model at 610 and then determining an error rate and the overall effectiveness of the maximized probabilities at 620. Higher than desired error rates may be remedied in part by further training of the model and/or updating the model, for example.

Figure 7:
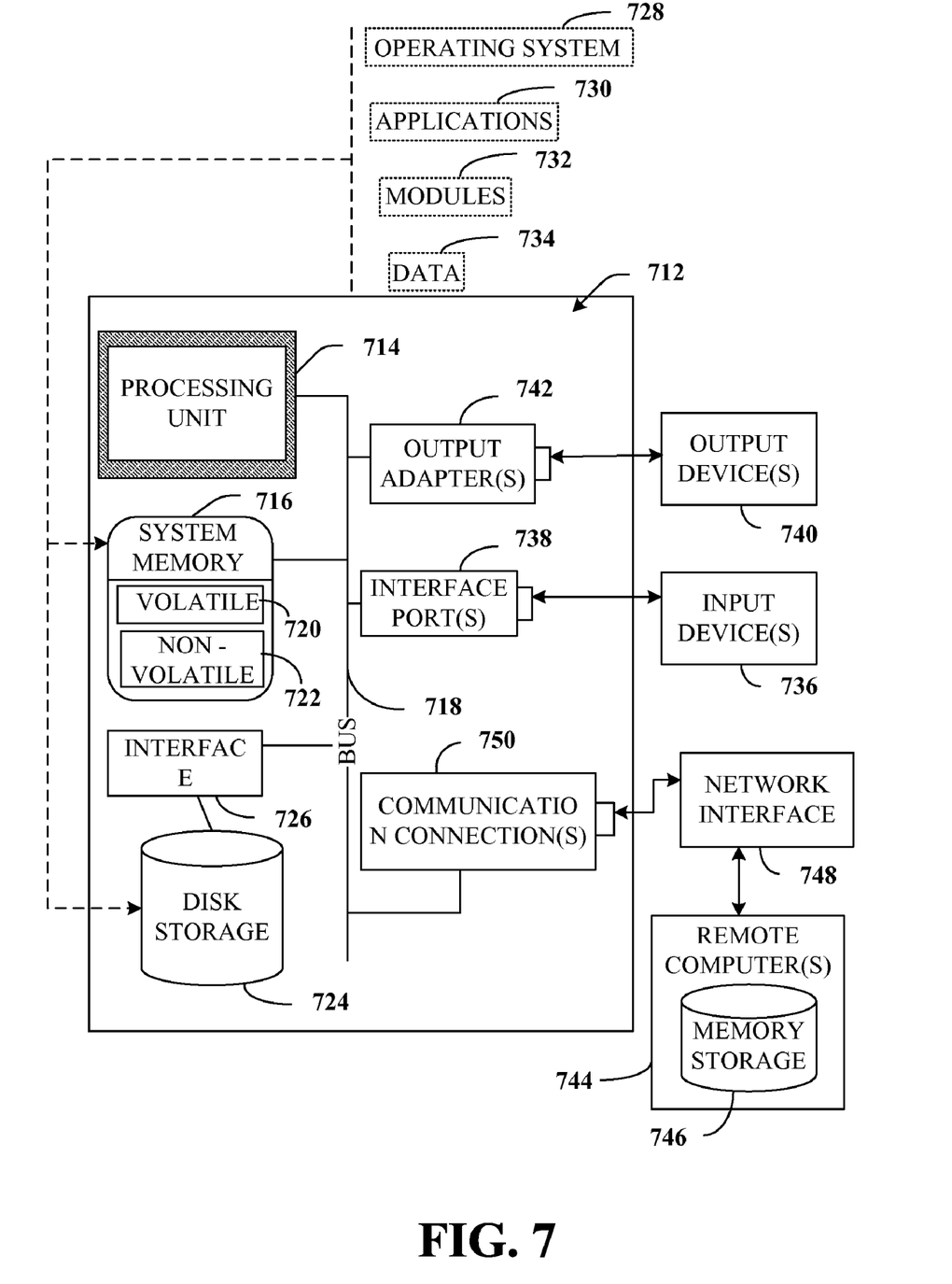
FIG. 7 is an exemplary environment for implementing various aspects of the invention.

In order to provide additional context for various aspects of the present invention, FIG. 7 and the following discussion are intended to provide a brief, general description of a suitable operating environment 710 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that can perform particular tasks or implement particular data types. The operating environment 710 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 7, an exemplary environment 710 for implementing various aspects of the invention includes a computer 712. The computer 712 includes a processing unit 714, a system memory 716, and a system bus 718. The system bus 718 couples the system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable ROM (EEPROM), or flash memory. Volatile memory 720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 712 also includes removable/nonremovable, volatile/nonvolatile computer storage media. FIG. 7 illustrates, for example, a disk storage 724. Disk storage 724 includes, but is not limited to, devices like a magnetic disk drive, floppy disk drive, tape drive, Jaz drive, Zip drive, LS-100 drive, flash memory card, or memory stick. In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 7 describes software that acts as an intermediary between users and the basic computer resources described in suitable operating environment 710. Such software includes an operating system 728. Operating system 728, which can be stored on disk storage 724, acts to control and allocate resources of the computer system 712. System applications 730 take advantage of the management of resources by operating system 728 through program modules 732 and program data 734 stored either in system memory 716 or on disk storage 724. It is to be appreciated that the present invention can be implemented with various operating systems or combinations of operating systems.

A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port may be used to provide input to computer 712 and to output information from computer 712 to an output device 740. Output adapter 742 is provided to illustrate that there are some output devices 740 like monitors, speakers, and printers among other output devices 740 that require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A machine implemented system that facilitates maximizing probabilities comprising:
    a data input component that provides one or more types of data for analysis;
    an analysis component that analyzes at least a subset of the one or more types of data to compute maximized probabilities by employing an improved iterative scaling function, a plurality of Exponential priors that respectively correspond to a plurality of different features, and at least one of a LaPlacian prior, a non-Gaussian distribution, or an alternative iterative scaling function; And
    a training component that computes one or more weights for respective test data based at least in part on the maximized probabilities.

2. The system of claim 1, the alternative iterative scaling function comprises generalized iterative scaling.

3. The system of claim 1, the alternative iterative scaling function comprises sequential generalized iterative scaling.

4. The system of claim 1, the plurality of Exponential priors employed depends on counts of the corresponding features.

5. The system of claim of 1, the plurality of Exponential priors depends in part upon a usefulness of a feature.

6. The system of claim 4, the counts are based in part upon a Good-Turing estimate.

7. The system of claim 1, the analysis component comprising:
    a maximization component that provides instructions for computing a maximum value;
    a model component operatively coupled to the maximization component that receives data from at least the maximization component and at least an Exponential prior component; and
    a probability processing component that employs information collected by the model component to compute one or more values.

8. A method effectuated on a machine that facilitates maximizing probability values, comprising:
    receiving types of data for analysis; and
    analyzing a subset of the types of data to ascertain maximized probabilities by utilizing an improved iterative scaling function and employing a plurality of Exponential priors that are respectively associated with different features; and
    training a machine learning system at least in part by applying weights to respective test data based on the maximized probabilities.

9. The method of claim 8, the analyzing further includes employing at least a LaPlacian prior or a non-Gaussian distribution.

10. The method of claim 8, the analyzing further includes utilizing other iterative scaling functions.

11. The method of claim 10, the other iterative scaling functions include sequential generalized iterative scaling.

12. The method of claim 10, the other iterative scaling functions include generalized iterative scaling.

13. The method of claim 8, the plurality of Exponential priors are employed based on counts of the associated features.

14. The method of claim 8, the plurality of Exponential priors are employed based on a usefulness feature.

15. The method of claim 14, the usefulness feature is an IP address.

16. The method of claim 8, the analysis further includes providing instructions that determine a maximum value.

17. The method of claim 8, further includes determining an Exponential distribution as a prior.

18. A system that facilitates maximizing probabilities, comprising:
    a memory for storing data; and
    a processor coupled to the memory configured to act as;
        a data input component that provides one or more types of data for analysis;
        an analysis component that analyzes at least a subset of the one or more types of data to compute maximized probabilities at least in part by employing an improved iterative scaling function, at least two Exponential priors corresponding to respective disparate features, and at least one of a LaPlacian prior or a non-Gaussian distribution; and
        a training component that trains a machine learning system based at least in part on the maximized probabilities.

* * * * *

UNITED STATES PATENT AND TRADEMARK OFFICE
CERTIFICATE OF CORRECTION

| | | |
|---|---|---|
| PATENT NO. | : 7,483,813 B2 | |
| APPLICATION NO. | : 11/550908 | |
| DATED | : January 27, 2009 | |
| INVENTOR(S) | : Joshua T. Goodman | |

It is certified that error appears in the above-identified patent and that said Letters Patent is hereby corrected as shown below:

In column 17, line 51, in Claim 1, delete "And" and insert -- and --, therefor.

In column 18, line 48, in Claim 18, delete "as;" and insert -- as: --, therefor.

Signed and Sealed this

Third Day of May, 2011

David J. Kappos
*Director of the United States Patent and Trademark Office*